United States Patent [19]

Ammon et al.

[11] Patent Number: 4,506,438

[45] Date of Patent: Mar. 26, 1985

[54] APPARATUS FOR MANUFACTURING INTEGRATED CIRCUIT CONNECTORS

[75] Inventors: J. Preston Ammon; Harry R. Weaver; Evan J. Evans, all of Dallas, Tex.

[73] Assignee: Elfab Corporation, Lewisville, Tex.

[21] Appl. No.: 504,335

[22] Filed: Jul. 12, 1983

Related U.S. Application Data

[62] Division of Ser. No. 316,998, Nov. 2, 1981, Pat. No. 4,417,396.

[51] Int. Cl.³ .............................................. B23P 19/04

[52] U.S. Cl. ...................................................... 29/739

[58] Field of Search .................... 29/564.6, 564.8, 423, 29/739, 747, 749, 759, 845, 854, 857, 881, 882, 884; 227/141

[56] References Cited

U.S. PATENT DOCUMENTS

| | | | |
|---|---|---|---|
| 3,444,619 | 5/1969 | Lomerson | 29/884 |
| 3,461,552 | 8/1969 | Wolf et al. | 29/845 |
| 4,127,934 | 12/1978 | Bartley et al. | 29/621 |
| 4,197,804 | 4/1980 | Uhlig et al. | 29/882 |
| 4,375,719 | 3/1983 | Kent | 29/759 |

*Primary Examiner*—Howard N. Goldberg
*Assistant Examiner*—P. W. Echols
*Attorney, Agent, or Firm*—John E. Vandigriff

[57] ABSTRACT

A multiplicity of integrated circuit connector contact sockets mounted to a plurality of carrier strips are moved between pairs of orientation rollers with tails of the contacts protruding upwardly whereby an upper socket portion of one contact is aligned with an upper socket portion of a contact on a carrier strip in an adjacent row. A plurality of integrated circuit connector insulators having socket receiving apertures formed therein are held together in an array and placed over the contact tails with one tail being received within each aperture of an insulator. The carrier strips are simultaneously advanced beneath a work station wherein a tool presses the insulators downwardly to tightly fit the contact socket portions into the receiving apertures in the insulators. A shearing tool then severs the insulators in the array from one another except for the continued affixation of the contact sockets to the parallel carrier strips. The carrier strips are then moved through a stripping station comprising a block having parallel channels for receiving the carrier strips and a flat inclined upper surface wherein the carrier strips are restrained from vertical movement while the inclined ramp strips the insulator mounted contacts from the carrier strips to form completed individual connectors.

6 Claims, 16 Drawing Figures

APPARATUS FOR MANUFACTURING INTEGRATED CIRCUIT CONNECTORS

This is a division of application Ser. No. 316,998 filed Nov. 2, 1981 now U.S. Pat. No. 4,417,396 issued Nov. 29, 1983.

BACKGROUND OF THE INVENTION

1. Field of the Invention

The invention relates to the manufacture of integrated circuit connectors and, more particularly, to a method and apparatus for rapidly installing strip-mounted integrated circuit connector contacts into integrated circuit connector insulators.

2. History of the Prior Art

In order to make both electrical and mechanical connection with the leads of an integrated circuit package, such as a dual-in-line package known as a DIP, there must be provided an integrated circuit connector comprising an insulative housing mounting a plurality of integrated circuit connector contacts in linear arrays corresponding to the positioning of the leads extending from the integrated circuit package. Integrated circuit connector contacts conventionally include a cylindrical upper socket portion, having a circular top opening for receiving integrated circuit package leads, and a downwardly extending tail portion. Each integrated circuit connector contact also preferably includes a small circular clip, including inwardly extending resilient tines, fitted into the cylindrical top openings. The lower ends of the tines are square and together the four tines form a square opening into the socket portion for gripping a package lead inserted therein. The external leads of an integrated circuit package are generally rectangular in cross-section and extend symmetrically from the package with respect to its longitudinal and transverse orthogonal axes. The leads are usually bent downwardly for connection so that the package resembles a multi-legged insect or "bug". Similarly, integrated circuit connector insulators are symetrical about their orthogonal longitudinal and transverse axes. For maximum reliability and flexibility of interconnection it is desirable that each of the connector contacts positioned in an insulator to form an integrated circuit connector have the rectangular tails of those contacts rotationally positioned so that the flat faces of the rectangular tails of the contacts are positoned in alignment with the longitudinal and transverse axes of the connector insulator. Further, it is also desirable that the integrated circuit lead clip mounted within the contact socket portion be rotationally oriented both with respect to the faces of the rectangular contact tail as well as the longitudinal and transverse orthogonal axes of the connector insulator.

In U.S. patent application, Ser. No. 187,499 filed Sept. 15, 1980, now U.S. Pat. No. 4,376,339, in the names of Preston Ammon, Harry R. Weaver, and Evan Evans entitled "Method and Apparatus for Orientating Integrated Circuit Clips and Sockets And Assembling Them Into Connector Contacts," a method and apparatus is disclosed whereby clips and sockets are oriented in respect to a carrier strip and positioned thereon with the contact tails extending away from and transversely of the carrier strips. The method and apparatus of the present invention is particularly adapted to be used with contacts oriented and mounted to carrier strips in accordance with the teaching of the Ammon, et al application.

Conventionally, integrated circuit connectors are manufactured by assembly of individual contacts into an insulator. The contacts are usually held in position by detent action or by the molded configuration of the insulator which locks to the contact to hold and support it. The assembly of such integrated circuit connectors is relatively slow and not particularly adapted to forming an integrated circuit connector wherein both the contacts and the lead clips therein are rotationally oriented with respect to the connector insulator. The method and apparatus of the present invention assembles integrated circuit connectors very rapidly. In addition, the connectors assembled may have the rectangular contact tails thereof rotationaly oriented with respect to the axes of the insulator and the square tines of the lead clips therein also rotationally oriented with respect to the axes of the square faces of the contact tails.

SUMMARY OF THE INVENTION

The present invention relates to a method and apparatus for manufacturing integrated circuit connectors, more particularly, one aspect of the invention includes a method of assembling integrated circuit connectors of the type having contacts secured within an insulator. The contacts have an upper socket portion for receiving an integrated circuit lead and a lower tail portion depending from the insulator. The method comprises the steps of providing a generally horizontal surface having a plurality of generally parallel channels formed therein. A plurality of equally spaced, integrated circuit contacts are provided upon a plurality of carrier strips, the contacts having tails extending upwardly from the carrier strips. There is provided an array of integrated circuit connector insulators having contact receiving apertures formed therein which are longitudinally spaced along the insulator array at distances equal to the spacing of the contacts upon the carrier strips. An advancing mechanism is provided adjacent the generally horizontal surface for engaging the carrier strips and periodically incrementally advancing the contacts in intermittent movement a predefined, longitudinal distance. The insulator array is placed upon the contacts of the carrier strip and the contact tails are received within the apertures. The insulators are pressed upon the contacts of the carrier strips to cause interference engagement between the contacts and the insulators and therefore a rigid mounting of the contacts. The carrier strips and insulator array secured thereto are advanced and individual insulators forming the array are separated one from the other upon the carrier strips to provide individual integrated circuit connector assemblies. The connector assemblies are then separated from the carrier strips to provide individual integrated circuit connectors.

In another aspect the invention includes a multiplicity of integrated circuit connector sockets mounted on equal spacings from one another to a plurality of carrier strips with the tails of the sockets extending transversely of and away from the carrier strips. A plurality of socket supporting carrier strips extend parallel to one another between pairs of orientation rollers with tails of the contacts protruding upwardly. The vertically oriented carrier strips then extend through a guide block having parallel linear channels formed in the upper surface thereof for receiving the strips and orienting the contact tails of each row with respect to the tails in adjacent rows, i.e. in the transverse direction. The longitudinal position of each of the carrier strips is independently adjustable so that the upper socket portion of each contact is aligned with the contact socket in the adjacent rows. A tail alignment fixture comprises a plurality of parallel pins extending perpendicularly to the axis of the carrier strips. When actuated, the pins move between adjacent ones of the contact tails extending upwardly from the parallel rows of carrier strips to align the tails in the longitudinal direction.

In another aspect of the invention, a plurality of integrated circuit connector insulators are molded in an array so that the socket receiving apertures form a rectangular grid pattern and the individual insulators are joined to one another in the array by the mold runner. While the upwardly extending contact tails are held in alignment, the insulator array is placed over the tails with one tail being received within each aperture of the insulators and full downward movement of the insulators being limited by the larger diameter socket portion of the contacts. When the carrier strips are simultaneously advanced longitudinally, the contacts bearing the loosely positioned insulator array is moved beneath a station at which a tool is lowered to press the insulators downwardly and tightly fit the contact socket portions into the receiving apertures in the insulators. The next longitudinal advance of the carrier strips moves the array to a station where a shearing tool severs the mold runners from the insulators and physically separates them from one another except for the continued affixation of the contact sockets to the parallel carrier strips. Finally, the carrier strips are moved through a stripping station comprising a block having parallel channels for receiving the carrier strips and a flat inclined upper ramp surface lower at the entering end than the exit end. As the carrier strips are moved longitudinally, they are restrained from vertical movement and the inclined ramp strips the insulator mounted contacts from the carrier strips to permit further longitudinal movement of the completed individual connectors into shipping tubes for further handling.

BRIEF DESCRIPTION OF THE DRAWINGS

For a more complete understanding of the present invention and for further objects and advantages thereof reference may now be had to the following description taken in conjunction with the accompanying drawings in which.

DETAILED DESCRIPTION

Figure 1:
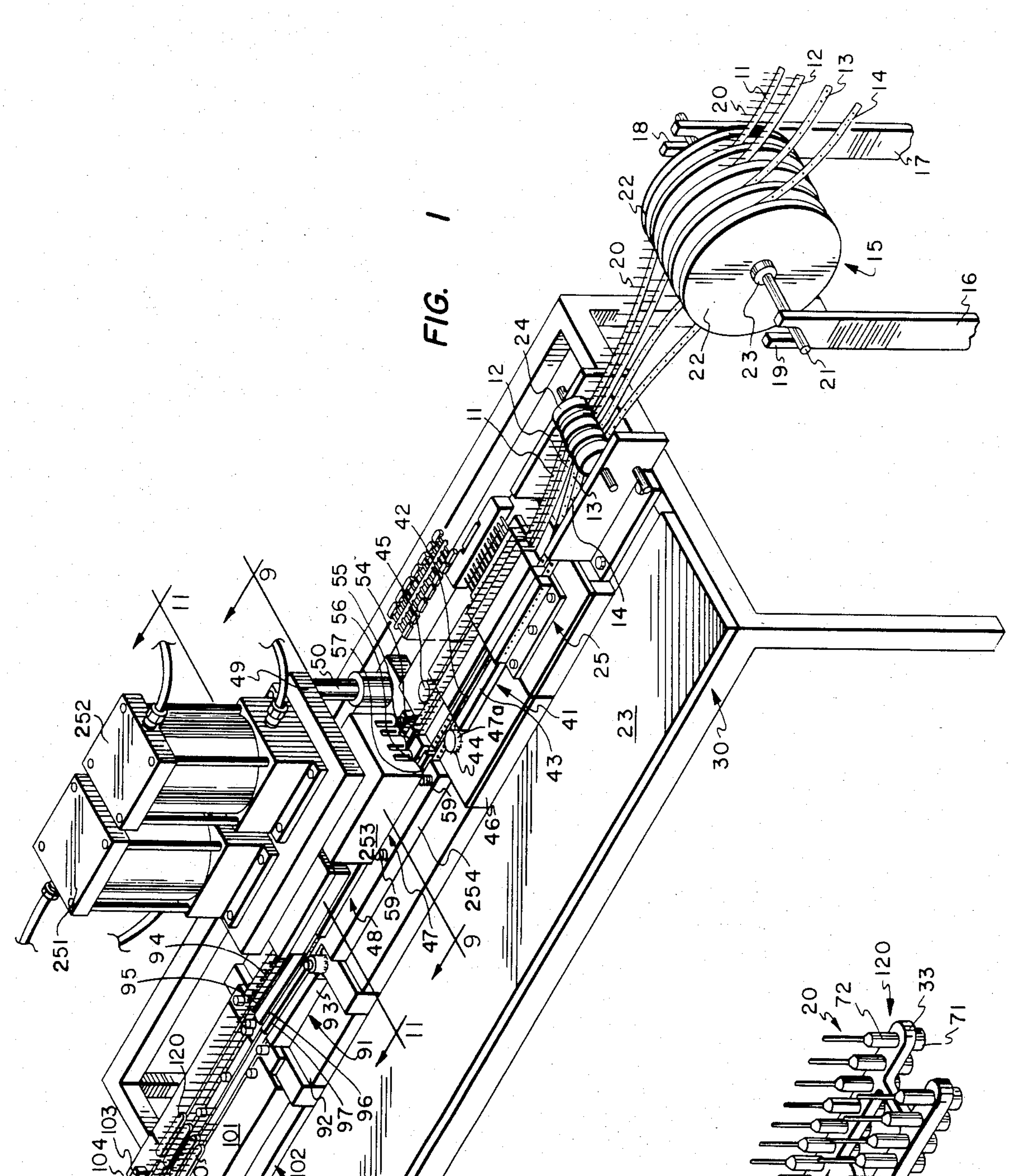
FIG. 1 is a perspective view of one embodiment of an apparatus for manufacturing integratred circuit connectors in accordance with the teachings of the present invention.

Referring first to FIG. 1, there is shown a perspective view of an apparatus for manufacturing integrated circuit connectors in accordance with the teachings of the present invention. As shown in FIG. 1, an automatic assembly network receives a plurality of carrier strips 11, 12, 13, and 14 having integrated circuit connector contacts 20 attached thereto. The strips 11–14 are wound from large reels (not shown) past a rotatable strip guide assembly 15. The contacts 20 are preferably placed on the carrier strips 11–14 in accordance with the techniques disclosed and claimed in U.S. patent application Ser. No. 187,499, filed Sept. 15, 1980, now U.S. Pat. No. 4,376,339, in the name of J. Preston Ammon, et al and entitled "Method and Apparatus For Orientating Integrated Circuit Clips and Sockets and Assembling Them Into Connector Contacts."

The strip guide assembly 15 comprises a pair of upright arms 16 and 17 having forks 18 and 19 at the upper ends thereof. A transverse rod 21 is mounted with opposing ends positioned within the forks 18 and 19. The transverse rod 21 has journaled thereon an array of circular disks 22 which are separated from one another by enlarged washers 23. The disks 22 loosely guide the contact supporting carrier strips 11–14 toward the first station mounted on an assembly table 30. Strips 11–14 are received between a plurality of vertically extending, horizontally spaced rollers 24 which serve to guide and straighten, if necessary, the carrier strips 11–14.

Figure 6:
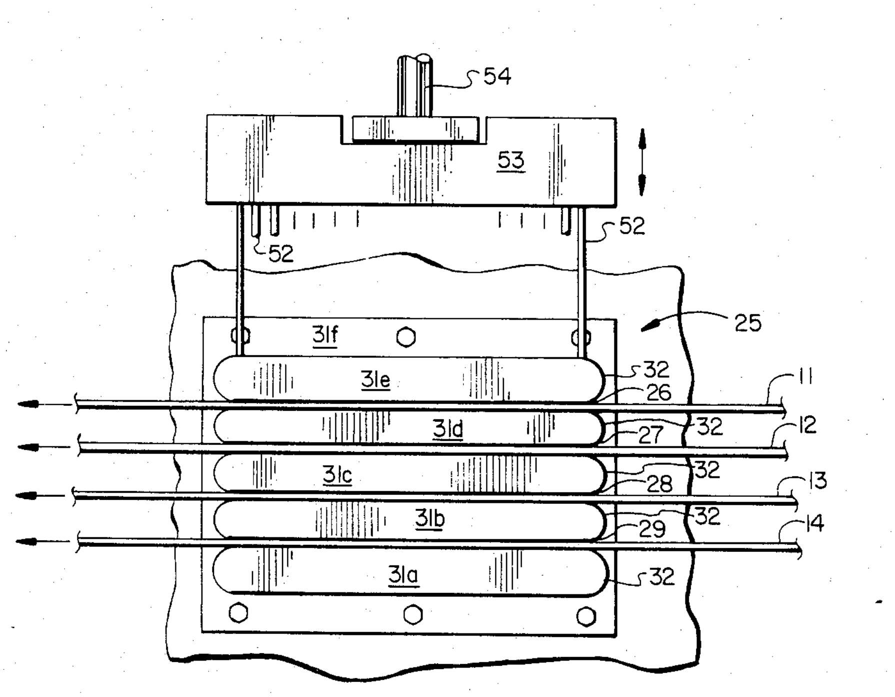
FIG. 6 is a top plan view of the contact tail alignment and insulator array installation station of the apparatus of the invention shown in FIG. 1.
Figure 7:
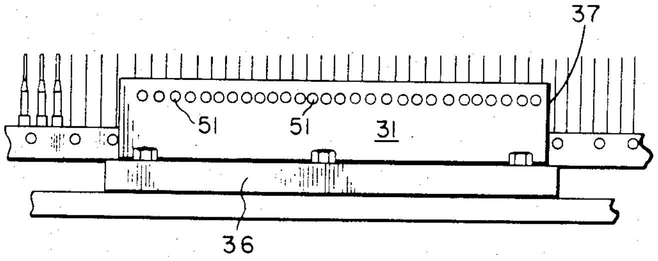
FIG. 7 is a side view of the station shown in FIG. 6.
Figure 8:
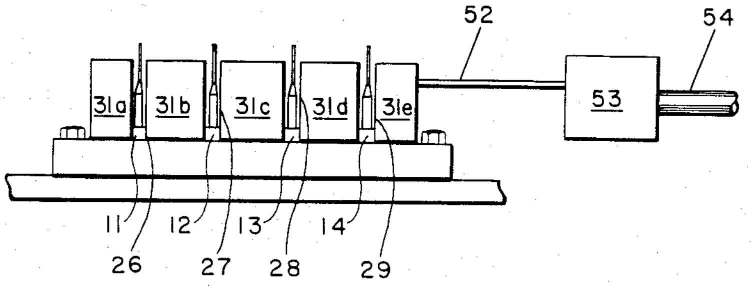
FIG. 8 is an end view of the station shown in FIG. 6.

The rows of contacts 20 carried by the strips 11–14 pass from the guide rollers 24 into a contact tail alignment and insulator array installation station 25 best shown in FIGS. 6, 7 and 8. As can be there seen, the strips 11–14 pass through four parallel, straight linear channels 26, 27, 28, 29 formed between the five guide blocks 31_a_, 31_b_, 31_c_, 31_d_, and 31_e_. Each of the guide blocks 31_a_–31_e_ are mounted to a flat base member 31_f_ affixed to the table 30 and include rounded ends 32 for guiding the contacts 20 into the narrow face between the blocks. Referring back to FIG. 1, each of the carrier strips 11–14 include sprocket receiving holes regularly spaced along their lengths to engage sprocket wheels such as 44 and 45. Each of the sprocket wheels of the apparatus is adjustable independently of all the others. Once adjusted, the sprocket wheels may be locked together, by means discussed below, to operate in synchronism. The individual adjustment of each sprocket wheel is necessary so that the longitudinal position of each of the carrier strips 11–14 may be adjusted whereby adjacent ones of the upper socket portions of the connector contacts 20 affixed to the strips 11–14 are brought into parallel alignment with one another. Once alignment in the longitudinal direction has been effected and all of the sprockets locked together as disclosed below, the upper socket portions of the contacts 20 in each of the four rows will remain in alignment. The contact tails of adjacent rows of contacts are aligned with one another by means of the mechanism best shown in FIGS. 6, 7, and 8.

Referring next to FIGS. 6–8, the aligned carrier strips 11–14 are passed between the guide blocks 31*a*–31*e*. Each of the guide blocks 31*a*–31*e* includes a plurality of axially spaced, transversely extending apertures 51 which receive tail alignment pins 52 mounted upon a transversely movable framework 53. The framework 53 is affixed to a piston rod 54 of an actuating air cylinder, (not shown). Each of the tail alignment pins 52 are spaced from one another on the same center line as the contacts 20 on the strips 11–14.

In operation, the actuating ram 54 is withdrawn and the four rows of previously aligned carrier strips 11–14 are advanced between the guide blocks 31*a*–31*e*. Groups of about fifty six contacts each are positioned and the ram 54 is advanced to move the tail alignment pins 52 between adjacent ones of the contact tails and through the apertures 51. The upper tips of the contact tails are now positioned in a rectangular grid array.

Figure 2:
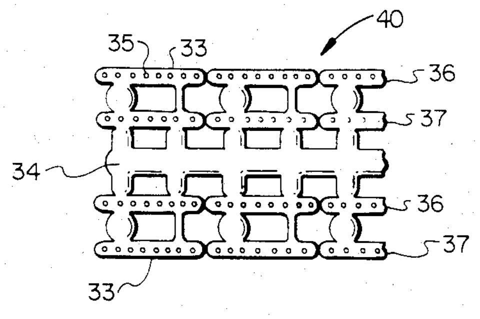
FIG. 2 is a fragmentary top plan view of a molded array of dual-in-line package integrated circuit connector insulators used in connection with the invention.
Figure 3:
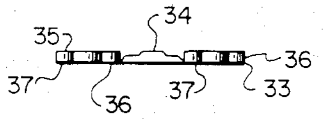
FIG. 3 is an end view of the molded insulator array of FIG. 2.
Figure 4:
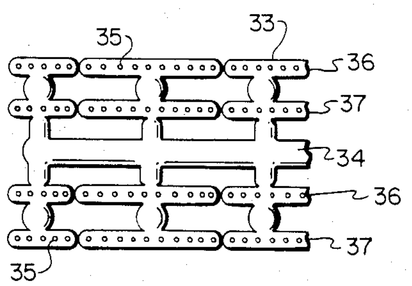
FIG. 4 is a top plan view of a molded array of single-in-line package integrated circuit connector insulators used in connection with the invention.
Figure 5:
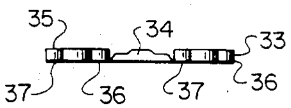
FIG. 5 is an end view of the molded insultor array of FIG. 4.

Referring now to FIGS. 2 and 3, in combination, there is shown a fragmentary top plan view of an array of integrated circuit connector insulators. There is shown in FIG. 2 an array of dual in line package (DIP) insulators, while in FIG. 4 there is shown a similar insulator array for single in line packages (SIPS). For purposes of discussion the DIP insulators of FIG. 2 will be addressed. Each insulator 33 is physically separated from the others in a longitudinal direction but fixed to the transversely adjacent insulator 33 by means of a carrier 34, such as the mold runner. Each insulator 33 comprises a molded plastic body having a plurality of apertures 35 spaced in the longitudinal direction along two adjacent arms 36 and 37. The apertures 35 are spaced from one another in the insulator the same distance as the outwardly extending interconnector leads of an integrated circuit device are spaced from one another. The size of each of the apertures 35 is slightly smaller than the diameter of the cylindrical shank portion of the connector contacts so as to provide a good tight press fit upon their interengagement. Each of the apertures 35 is spaced one from the other the same distance as adjacent ones of the contacts 20 attached to the carrier strips 11–14 are spaced one from the other.

The spacing, in the transverse direction, between the apertures 35 on arm 36 and the apertures 35 on arm 37 is the same as the spacing between adjacent ones of the carrier strips 11–14.

Once the contact tails are held in a rectangular array in the tail straightening station 25, an array 40 of the integrated circuit connector insulators 33 of FIG. 2 is placed down onto the station 25 so that the tails of the connector contacts extend up through the apertures 35 in the insulators 33. In this manner the insulators 33 may be moved down the contact tails to abut the larger cylindrical shank portion of the contacts 20. Once the insulator array is in place, the tail straightening pins 52 are withdrawn from the apertures 51 in the guide blocks so that the carrier strips 11–14 and the insulator array 40 can be advanced to the next station.

Referring again to FIG. 1, station 41 is shown and comprises an inspection station which includes a plurality of parallel channels 42 formed in a block 43 having a flat upper surface which is flush with the insulator array 40. The inspection station 41 presents the opportunity to insure that all the insulators and contacts have been positioned properly. A pair of idler guide sprockets 44 and 45 are mounted to the upper surface of a support bulkhead 46 and are freely rotatable about a vertical axis. The guide sprockets 44 and 45 include outwardly extending protrusions or teeth 47*a* which engage the series of guide holes in the carrier strips 11–14. The guide sprockets 44 and 45 thus keep the carrier strips in vertical alignment with one another. As the carrier strips 11–14 leave the guide sprockets 44 and 45 the contacts and the insulator arrays positioned thereon pass into the pressing station 47.

Still referring to FIG. 1, a pressing station 47 and a shearing station 48 are disposed downstream of station 41. The pressing station 47 and the shearing station 48 include a common support platform (such as die press) 49 upon which a pair of pneumatic cylinders 251 and 252 are mounted for movement thereof. A pair of side guides 50 guide the upper and lower movements of the platform 49. The ram of air cylinder 252 is affixed to a pressing block 253. Beneath the pressing block 53 is a guide plate 254 having a plurality of parallel guide channels 55, 56, 57 and 58 guiding strips 11, 12, 13 and 14, respectively. A series of springs 59—59 serve to bias the pressing blocks upwardly.

Figure 9:
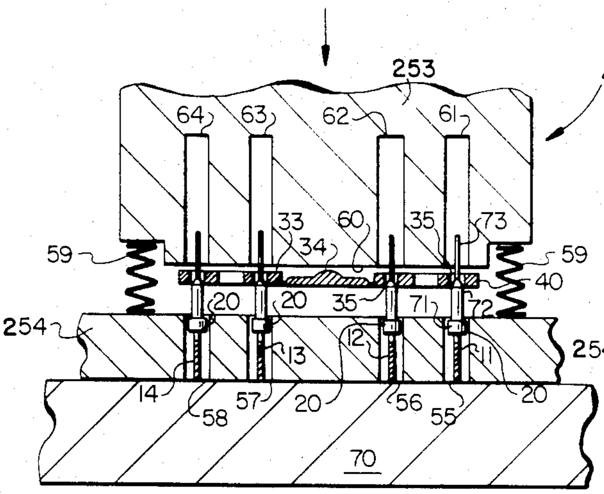
FIG. 9 is an enlarged, cross-sectional, end elevational view of the insulator pressing station of FIG. 1 and illustrating the pressing of connector insulators onto the contact shanks with the press being shown in the raised position.
Figure 10:
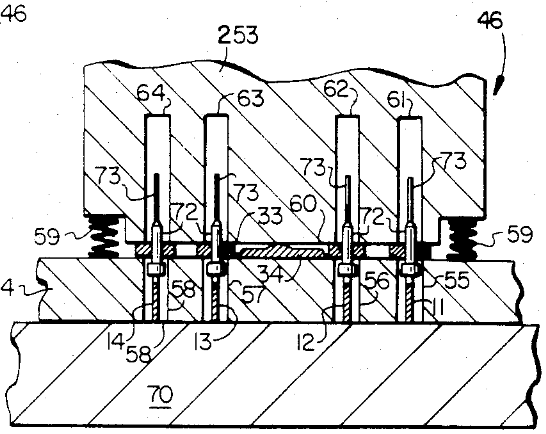
FIG. 10 is an end elevational view of the insulator pressing station of FIG. 9, with the press being shown in the lowered position.

Referring now to FIGS. 9 and 10 there is shown an enlarged, fragmentary, cross-sectional view of the pressing station 47 in its raised and lowered position, respectively. The guideplate 254 rests upon a support plate 70 and the pressing blocks 253 include a plurality of parallel guide channels 61, 62, 63, and 64 which freely receive contact tails therein. Each of the integrated circuit connector contacts 20 herein shown in station 47 comprise a cylindrical upper shoulder 71, a generally cylindrical shank region 72, and a square elongate tail 73. The contacts 20 are oriented with respect to the carrier strip as described above. The array 40 of connector insulators 33 has been placed down over the tails of the contacts 20 so that circular apertures 35 in the insulators 33 have come to rest against the enlarged cylindrical shank portion 72 of each contact. Referring specifically to FIG. 10, the ram 253 is lowered and the contact tails 73 are received up into the guide slots 61–64 with the flat underface 60 of the ram 253 coming into contact with the flat upper surface of the array 40 of insulators 33. Each of the insulators 33 comprising the array 40 is then pressed down upon the contacts 20 so that the shank portion 72 of each of the contacts form a snug press fit engagement with the inner walls of the apertures 35 of the insulators 33. The ram 253 is the raised after pressing and the carrier strips 11–14 are advanced to move the now assembled insulator-contact array to the next station for shearing.

Figure 11:
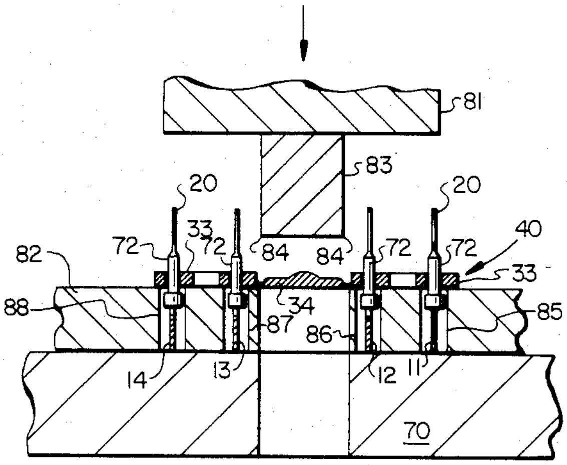
FIG. 11 is an enlarged cross-sectional, end elevational view of the insulator shearing station of FIG. 1 taken about the lines 11—11 thereof, and illustrating the shearing of an insulator array with the press being shown in the raised position.
Figure 12:
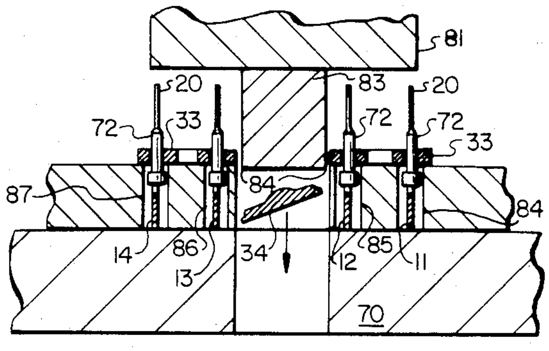
FIG. 12 is an end elevational view of the shearing station of FIG. 11 with the press being shown in the lowered position.

Referring now to FIGS. 11 and 12, there is shown, respectively, cross-section views of the shearing station in first a raised and then a lowered position. A shearing ram 81 is affixed to the ram of air cylinder 251. The underside of the ram 81 includes a shearing punch 83, having a pair of sharp edges 84. The support structure 70 underlies a guide plate 82 having a plurality of slots 85, 86, 87 and 88 for receiving and guiding, respectively, strips 11, 12, 13 and 14. The carrier strips 11–14 have the arrays 40 of the connector insulators 33 securely positioned thereon by interference fit with the shank portions 72 of the contacts 20. The array 40 of insulators 33 is still formed integral with the carrier portion 34.

Referring now to FIG. 12, the shearing ram 81 is shown in the lowered position whereby the sharp lower edges 84 of the punch 83 have sheared the carrier 34 from the array 40 to separate each of the insulators 33 from one another. It should at this point be noted that the array 40 of integrated circuit connectors 33 is preferably formed with a common carrier 34 comprising the plastic runner which remains after the insulators are moulded in a conventional injection molding machine.

Referring again to FIG. 1, after the interconnecting carrier 34 has been sheared away to separate the individual insulators 33 from one another in a transverse direction, the remaining assembled elements are integrated circuit connectors 120 affixed to contact carrier strips. All that remains at this point is to remove the contacts 20 from the carrier strips 11–14 and thereby separate the finished integrated circuit connectors from the carrier strips for separate handling.

After the strips 11–14 leave the shearing station 48, they pass into a stripping station 91 which is comprised of a mounting plate 92 upon which is mounted a ramp shaped block 93 having parallel spaced guide channels 94, 95, 96, and 97. The channels 94, 95, 96 and 97 receive, respectively, the carrier strips 11–14. The channels 94–97 are relatively narrow and are narrower than the cylindrical portion 71 of the connector contacts 20 but wider than the width of the carrier strips 11–14 so that contacts and strips can be separated.

Figure 13:
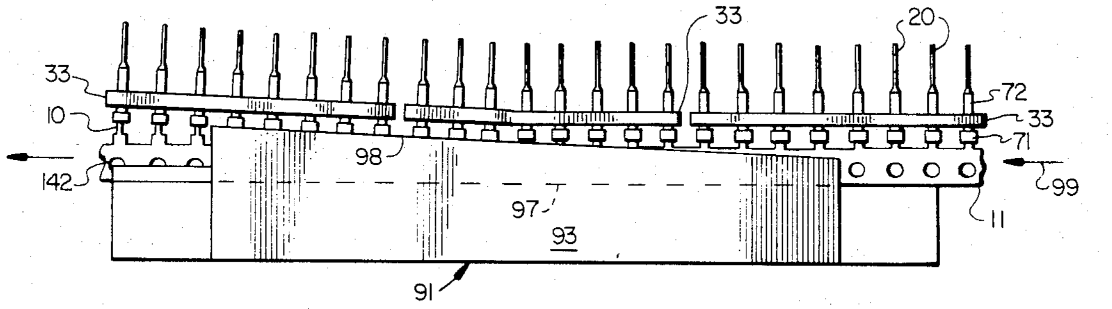
FIG. 13 is an enlarged, side elevational view of the ramping station of the apparatus of FIG. 1 wherein contacts are removed from their carrier strips.

Referring now to FIG. 13 there is shown a side view of the stripping station 91. As is clear from the teaching of the above-cited Ammon, et al patent, each contact 20 is affixed to the carrier strips 11–14 by virtue of a small protrusion 10 extending transversely from the carrier strip. The protrusions 10 are received into a resilient clip (not shown) within the interior of the upper end of the socket portion. An axial force of relatively small magnitude will separate the carrier strip protrusions 10 and the socket. It will be noted that the upper surface of block 93 forms a ramp-like surface which is lower on the entry end than on the exit end. As the carrier strips 11–14 pass along in the direction of the arrow 99, the carrier strip is received into the narrow channel 97 and the cylindrical open end 71 of the contacts 20 abuts the upper surface 98 of the block 93. As the strip 11 is moved further along the ramp shaped block 93 the upper surface 98 of said block bears against the cylindrical portions 71 of the contacts 20 to exert an axial force upwardly against the contact with respect to the carrier strip 11. The carrier strip is held down in the vertical direction by engagement with idler sprockets (not shown) and the contact sockets are stripped from the carrier strip projections 10 by the ramp action of block 93 to produce completed integrated circuit connectors 120.

Referring again to FIG. 1, block 101 forms the upper surface of a carrier strip drive mechanism 102. The completed integrated circuit connectors 120 are separated from the carrier strips and move along the upper surface of block 101. After the contacts 20 of connector 120 leave the surface 101, they pass between a plurality of walls 103 forming guide chutes 104 and 105 for receiving, respectively, the two rows of assembled connectors 120. The guide chutes 104 and 105 extend horizontally along a region 106 and then at an angle downwardly in the region 107. A pair of loading gates 108 and 109 are positioned transversely of the chutes 104 and 105 for the effective loading of rows of completed connectors 120 into handling tubes 110. A plurality of handling tubes 110 are positioned in magazines 111 at the lower ends of the handling chutes 104 and 105. The gate 109 is positioned immediately in front of the open ends of two adjacent handling tubes 110. As the two rows of completed connectors are moving down the chutes, the gate 108 is first opened to allow a sufficient number of connectors 120 in a row to be gravity fed and abut against the second gate 109. As soon as the chutes between the gates 108 and 109 are full, the gate 108 is closed briefly and gate 109 opens so that the two rows of connectors slide down into the two adjacent storage tubes 110.

Figure 16:
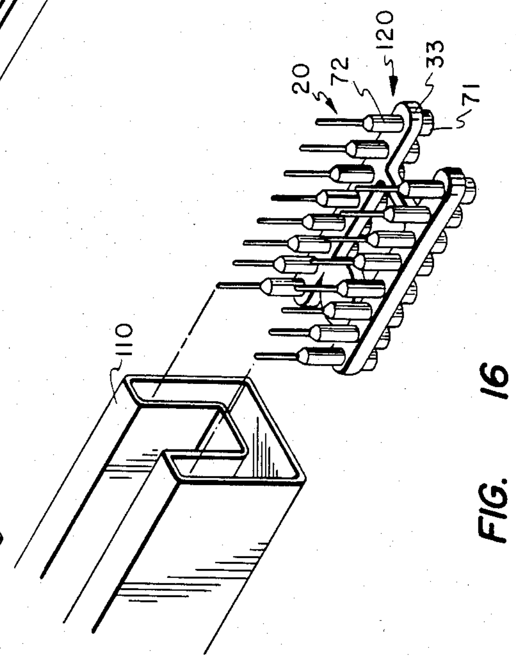
FIG. 16 is an enlarged perspective view of an assembled integrated circuit connector being inserted into a storage and handling tube.

Referring briefly now to FIG. 16, there is shown an inverted completed integrated circuit connector 120 and the manner in which the completed connectors are received into the molded plastic receiving storage and shipping tubes 110. As shown, the tubes 110 include recesses for receiving the downwardly projecting portions of the contacts and holding the connectors against undue movement within the tubes.

Figure 14:
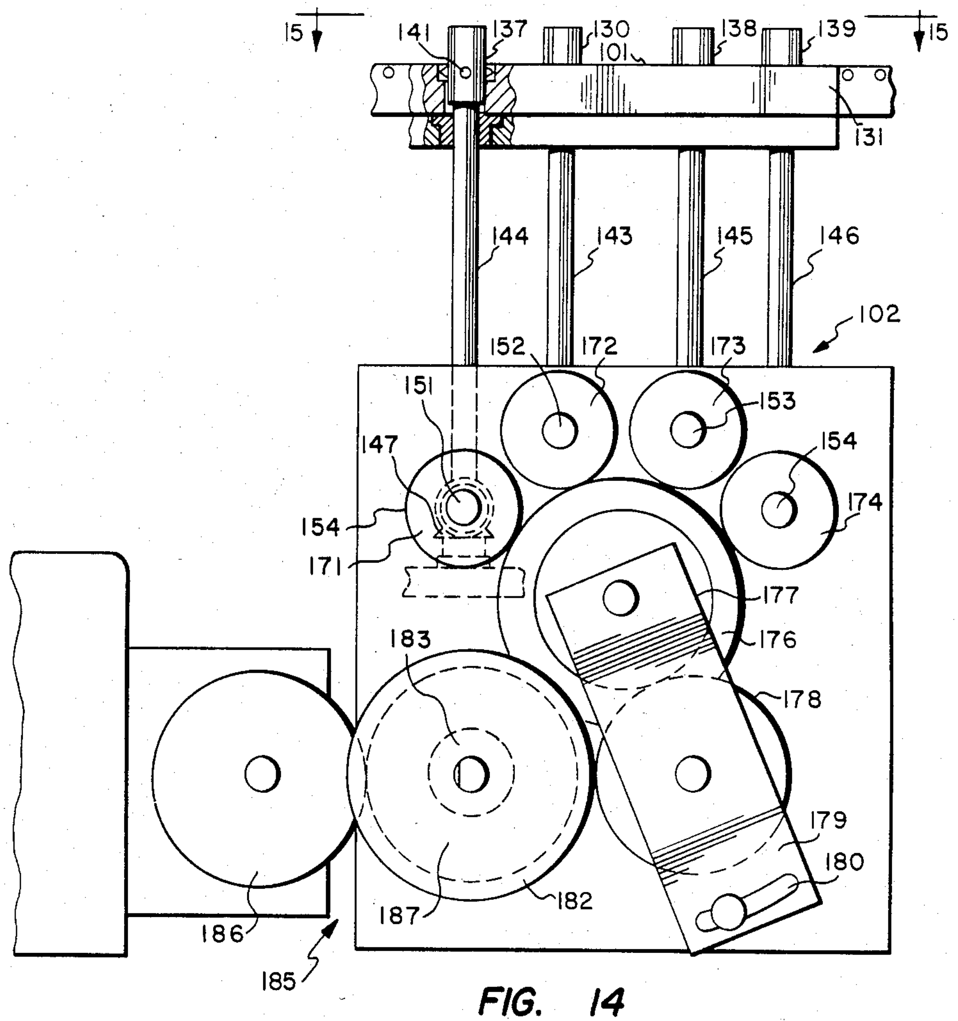
FIG. 14 is an enlarged, partially cut-away, side elevational view of the carrier strip advancing and relative positioning station of the apparatus of FIG. 1.
Figure 15:
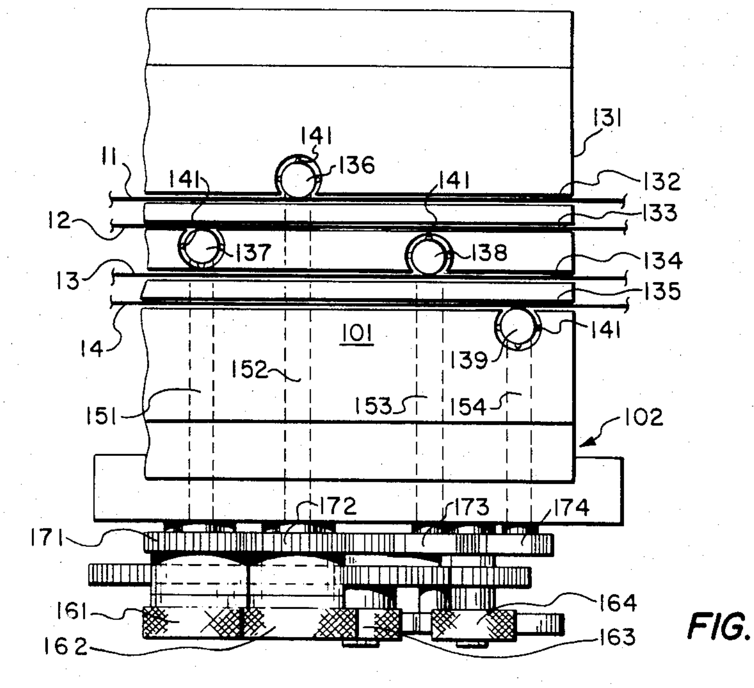
FIG. 15 is a top plan view of the carrier strip advancing and relative positioning station shown in FIG. 14.

Referring now to FIGS. 14 and 15 in combination, there is shown a partially cut-away side view of the carrier strip drive mechanism 102. As shown most clearly in FIG. 15, there is formed in the upper surface 101 of the plate 131 a plurality of guide slots 132, 133, 134 and 135 through which the carrier strips (not shown) will pass. Drive sprockets 136, 137, 138 and 139 each include radially outwardly projecting teeth 141 which extend into the guide slots 132–135 respectively. The teeth 141 engage the tooling holes 142 (FIG. 13) equally spaced from one another along each one of the carrier strips 11–14. Each of the driving sprockets 136–139 is affixed to the vertical drive shafts 143–146 respectively. The vertical drive shafts are coupled by bevel gears 147 (shown in phantom) to a plurality of horizontal drive shafts 151, 152, 153, 154. Shafts 151–154 may be seen to include knobs 161, 162, 163, 164, respectively on the outer ends thereof. On moving the adjustment knobs 161–164 axially, inwardly and outwardly, the shafts 151–154 remain stationary but are first engaged and then disengaged from the drive mechanism as described below. In this manner longitudinal adjustment of the various carrier strips may be made independently of one another to transversely align the respective rows of contacts.

Referring now specifically to FIG. 14, it may be seen that shafts 151–154 have secured thereto drive gears 171, 172, 173, and 174, respectively. Each gear 171–174 is disposed behind and coupled to the knobs 161–164, respectively. Axial movement of the knobs 161–164 moves the gears 171–174 relative to the shaft 151–154 and the main frame drive gear 176. The main gear 176 is concentrically mounted to pick-up gear 177 which is coupled to idler gear 178. Gears 177 and 178 are rotatably mounted upon a pivot frame 179 having an engagement adjustment slot 180 arcuately formed in the lower end thereof. In this manner the idler gear 178 can be pivoted into and out of engagement with the primary gear 182. The primary gear 182 is driven through a single 360 degree rotation through a convention pawl-clutch 183 (shown diagrammatically in phantom) from main drive train 185. The drive train 185 includes a motor gear 186 which constantly rotates clutch gear 187. The clutch gear 187 engages primary gear 182 causing a single 360 degree rotation through actuation of a conventional solenoid (not shown). Actuation of the solenoid (not shown) allows only one revolution of the gear 182 and the resultant rotation of the gears 178, 177, 176 and 171–174 coupled thereto. The gear ratios in gears 178, 177, 176 and 171–174 are selected to advance the carrier strips 11–14 a distance exactly equal to the exact center-to-center spacing between adjacent connector insulator arrays 40 along the path described above.

In operation the carrier strips 11–14 are loaded from their reels (not shown) into the apparatus of the present invention through the strip guide assembly 15, rollers 24 and the parallel channels formed along table 30. Each of the carrier strips 11–14 include sprocket holes regularly spaced along their lengths to engage both guide and driving sprocket wheels in the mechanism of the present invention herein described. Each of the driving sprocket wheels is independently adjustable of one another and then, once adjusted, may be all locked together to operate simultaneously in synchronism. The individual adjustment is necessary so that the longitudinal position of each of the carrier strips 11–14 may be adjusted with respect to one another to bring adjacent ones of the connector contacts affixed to adjacent strips into transverse alignment with one another.

The strips 11–14 are thus fed through the sprockets 136–139 of the drive mechanism 102. Knobs 161–164 disengage gears 171–174 from main gear 176 to allow free rotation of sprockets 136–139 and manual feeding, shifting, and aligning of the strips 11–14. The strips are secured against forward motion during mounting and pressing the insulators array thereon and while separating the insulators one from the other. Axial movement of the knobs 161–164 moves the gears 171–174 relative to the shaft 151–154. Thus gears 171–174 may be disengaged from the shafts 151–154 to permit relative rotation therebetween and re-engagement of the main gear 176 without affecting the critical alignment of the strips 11–14. Once alignment is effected the gears 171–174 are relocated into engagement with the main gear 176 and re-secured to shafts 151–154. The system is then ready for synchronized advancement of strip 11–14 and once properly aligned, the gears 171–174 can be subsequently disengaged from the drive train by axial movement of knobs 161–164 without affecting relative alignment of the strips 11–14 when the gears are re-engaged. This feature permits one or more of the strips 11–14 to be singularly advanced or shifted without destroying its aligned sprocket position with the other strips once the gears 171–174 are re-engaged.

Referring now to FIG. 1, the aligned strips 11–14 are advanced by actuation of control panel 190. Each contact strip advance is selected through the proper gear ratio in the drive mechanism 102 to the precise length of the distance between adjacent connector arrays 40. The array 40 is thus loaded onto the contacts 20 at installation station 25 and then advanced toward the pressing station 47. The length of advance may also be seen to be keyed to the distances been each work station. At the first work station 25 each contact 20 is aligned by the tail alignment pins 52 which locate each contact tail in the proper grid pattern prior to receiving the insulator array 40. The array 40 is formed to accept the precise grid pattern established by the pins 52. The pins 52 are then retracted while the strips 11–14 are motionless and the array 40 installed. The strips 11–14 are then advanced and contact-insulator array 40 is positioned under the pressing ram 253. Again while the strips are motionless the contacts are assembled into a tightly assembled, press fit configuration by pressure of the ram 253 upon the insulators of array 40. The ram 253 is then raised and the strips 11–14 again advanced to the aforesaid distance to beneath the shearing station 48. Shearing ram 81, preferably actuated in synchronization with pressing ram 253 and alignment pins 52, severs the common carrier of the insulator array 40 into individual connectors 120. The connectors 120 are next advanced with the strips 11–14 to the stripping station 91. The inclined surface 93 of station 91 then raises the connectors 120 away from the strips 11–14 as they are advanced. The separated components 120 are shoved one behind the other into guide chutes 104–105 and are loaded into handling tubes 110 or other suitable storage devices. The magazine 111 is shown for purposes of illustration to show one method of packaging the connectors 120 assembled by the method and apparatus of the present invention.

It is thus believed that the method and construction of the present invention will be apparent from the foregoing description. While the method and apparatus for manufacturing integrated circuit connectors shown and described, have been characterized as being preferred, it will be obvious that various changes and modifications may be made without departing from the spirit and scope of the invention as defined in the following claims.

What is claimed is:

1. Apparatus for assembling socket contacts mounted to a plurality of carrier strips with integrated circuit connector insulators provided in predefined arrays, each of said contacts comprising an enlarged upper socket portion received within apertures in the insulator for receiving integrated circuit leads therein and a lower tail portion for depending from said insulator for electrical connection, said apparatus comprising:

a generally horizontal surface having a plurality of generally parallel channels formed longitudinally thereacross for receiving contact carrier strips having contact sockets affixed thereto and contact tails extending transversely thereof;

means for advancing said contact carrier strips upon said horizontal surface in synchronized, intermittent movement of predefined longitudinal distances;

means for aligning the tails of the contacts extending from the carrier strips upon said surface into preselected alignment for being received into apertures formed in linear rows in the insulators and positioned in linear alignment within the insulator array;

means for press-fitting the contact socket portions into the apertures of the insulator of the array;

means for separating individual ones of said insulators of the array one from the other upon said horizontal surface to provide individual integrated circuit connector assemblies; and means for separating said connector assemblies from said carrier strip including means for advancing said assembled contacts and insulators transversely relative to the carrier strips for removing the contacts therefrom.

2. The apparatus as set forth in claim 1 wherein said means for advancing said assembled contacts and insulators includes a slotted incline plane positioned upon said surface, said slots receiving said carrier strips therein and said incline plane receiving said insulators thereupon, and means for restraining said carrier strips from vertical movement during the advance of said strips within said slots to impart movement of said insulators along said plane and transversely away from said strips.

3. The apparatus as set forth in claim 1 wherein said means for separating said insulator comprises a shearing tool disposed above said insulator array upon said surface.

4. The apparatus as set forth in claim 1 wherein said means for advancing said carrier strips upon said surface includes means for engaging a plurality of said carrier strips in selective alignment one with the other and simultaneously moving said strips forward the distance of the center-to-center spacing of the insulator arrays along the carrier strip.

5. The apparatus as set forth in claim 4 wherein said means for moving said strips forward includes means for securing said strips against forward motion when said alignment means and said press-fitting means are actuated.

6. The apparatus as set forth in claim 5 wherein said apparatus further includes means for simultaneously actuating said press-fitting means, said alignment means and said means for separating said insulators, and wherein said press-fitting means, said alignment means and said separating means are disposed upon said surface at locations relative to said carrier strips which are longitudinally disposed one from the other.

* * * * *